United States Patent
Sah et al.

(10) Patent No.: US 7,689,972 B2
(45) Date of Patent: Mar. 30, 2010

(54) SYSTEM AND METHOD FOR PRODUCING SOFTWARE PATCHES

(75) Inventors: Maneesh Sah, Bothell, WA (US);
Georgi Tonev, Redmond, WA (US);
Munil Shah, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/086,129

(22) Filed: Mar. 21, 2005

(65) Prior Publication Data

US 2006/0212849 A1     Sep. 21, 2006

(51) Int. Cl.
*G06F 9/44* (2006.01)
(52) U.S. Cl. .................. 717/124; 717/120; 717/122
(58) Field of Classification Search ......... 717/124–129, 717/168–171
See application file for complete search history.

(56) References Cited

U.S. PATENT DOCUMENTS

| 5,481,713 | A | * | 1/1996 | Wetmore et al. ............ 717/170 |
| 5,579,509 | A | * | 11/1996 | Furtney et al. ................ 703/27 |
| 5,659,722 | A | * | 8/1997 | Blaner et al. ................. 712/234 |
| 5,669,001 | A | * | 9/1997 | Moreno ....................... 717/149 |
| 6,389,592 | B1 | * | 5/2002 | Ayres et al. .................. 717/172 |
| 6,862,581 | B1 | * | 3/2005 | Lambiase ..................... 705/51 |
| 6,990,660 | B2 | * | 1/2006 | Moshir et al. ................ 717/171 |
| 7,080,356 | B2 | * | 7/2006 | Atallah et al. ................ 717/124 |
| 7,243,346 | B1 | * | 7/2007 | Seth et al. .................... 717/163 |
| 7,305,375 | B2 | * | 12/2007 | Cioccarelli ..................... 707/1 |
| 2004/0107416 | A1 | * | 6/2004 | Buban et al. ................. 717/170 |
| 2005/0071838 | A1 | * | 3/2005 | Hatasaki ...................... 717/168 |
| 2006/0101457 | A1 | * | 5/2006 | Zweifel et al. .............. 717/174 |

* cited by examiner

*Primary Examiner*—Philip Wang
(74) *Attorney, Agent, or Firm*—Wolf, Greenfield & Sacks, P.C.

(57) ABSTRACT

A system and method for last known good (LKG) for patches. A file cache is created to store binaries which have shipped as part of a previous wide public release—security fixes (GDRs) and service packs. There are two levels of cache, including an SP cache which keeps all of the files which were shipped as part of the service pack, and a GDR cache which keeps all of the files shipped in the GDRs. Customers do not need to download all of the binaries contained in a package when they already have the version of the dependent binaries on their system when they get the new patch. Customers only need to test the binaries which have changed, rather than everything in the new package, which speeds up the deployment of critical patches.

19 Claims, 11 Drawing Sheets

SYSTEM AND METHOD FOR PRODUCING SOFTWARE PATCHES

FIELD OF THE INVENTION

The embodiment of the present invention relates to a system and method using a last known good (LKG) method for patches, and more particularly, to a system and method for software patches in which binaries are tested.

BACKGROUND OF THE INVENTION

Software patches typically contain more than one binary in them, and in many cases only a smaller set of the binaries contained in the package actually need to be new. Other binaries (called dependent binaries from here on) are carried along because they are required for the changed binaries to function properly. When a new fix (patch) needs to be released, the latest version of all the binaries is typically included in the patch whether they need to be new or not. Testing of such patches can take several weeks to complete.

While these systems are effective for distributing patches, they include a number of disadvantages. First of all, the time to release the patches is relatively lengthy. There are also quality risks due to carrying more changes than are actually required. There is also an extra download cost for the customers in the inclusion of the additional information that is not actually needed. Furthermore, additional costs are incurred in that many corporate customers tend to test the patches in a test environment before they deploy them on their production servers. If more changes are shipped than necessary, the customers are required to do more testing than is actually needed.

The embodiment of the present invention is directed to providing a system and method that overcome the foregoing and other disadvantages. More specifically, the present invention is directed to a system and method that uses a last known good method for patches.

SUMMARY OF THE INVENTION

A system and method for last known good (LKG) for patches is provided. In accordance with one aspect of the invention, a file cache is created to store the binaries which have shipped as part of the previous wide public releases—security fixes (general distribution releases (GDRs)) and service packs (SPs). There are two levels of cache, SP cache and GDR cache. The SP cache keeps all the files which were shipped as part of the service pack. The GDR cache keeps all the files shipped in the GDRs. The GDR cache is given priority over the SP cache if the binary exists there.

In accordance with another aspect of the invention, once the cache is created for both the SP and the GDR, all of the binaries which had regressions in them will be deleted to avoid their being shipped in future public releases. The GDR cache will be created once a GDR ships, and all of the packaging scripts will point to the latest version of the GDR cache. This allows for traversing to previous releases in case the binary was not part of the recent release.

In accordance with another aspect of the invention, the packaging process takes all of the binaries which are listed as the affected binaries for a particular packaging job that are submitted and performs the following steps. All of the binaries are determined which need to be included as dependency for the service pack level specified in the job submission. If there are no dependent binaries, then the LKG process does not need to run and the latest versions of all the binaries are picked up. If there are binaries which need to be included as dependencies, then a determination is made if any of the dependent binaries exist in the SP cache or the GDR cache. If no dependent binaries exist, then the packaging process picks up the latest version of those binaries for packaging. If dependent binaries do exist, then a determination is made as to when the dependency was introduced by looking at the generation time for the binary in question, and synchronizing the dependency database (which is a file used to keep track of binary dependencies) to the generation time of the binary. If the dependency existed at this time, this binary can be picked up from the LKG cache SP or GDR, depending on which is newer. If the dependency did not exist at this time, it means that this dependency was introduced after the version of the binary available in either the GDR or the SP cache.

Another way to determine the dependent binary information is to store the file version when the dependency is introduced between two binaries. The dependency is expressed by stating that for this binary to work properly, a version equal to or higher than a particular version of the dependent binary must exist. How this works is by finding out the version of the binary where the dependency was introduced and then looking up a cache (GDR and/or SP) to see if that or a better version of the dependent binary is available.

Once all of the binaries are identified for the packaging, the packaging process is run to create the package.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
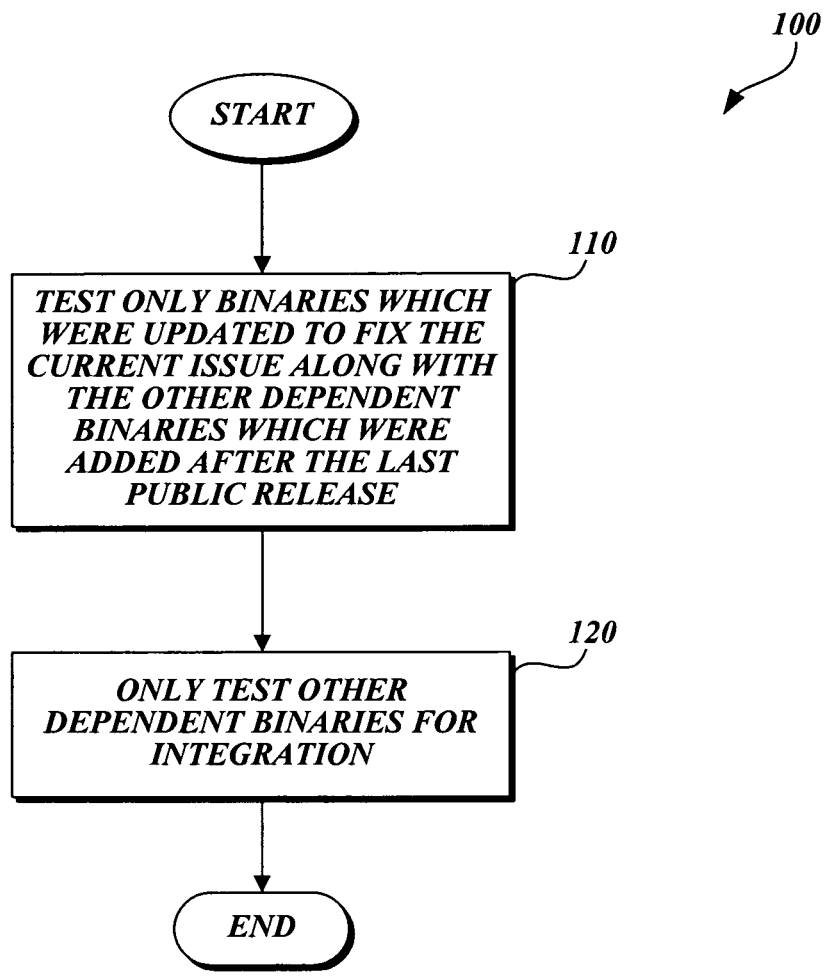
FIG. 1 is a flow diagram illustrative of a general routine for testing selected binaries.

FIG. 1 is a flow diagram illustrative of a general routine 100 for testing selected binaries. At a block 110, a test is done only for binaries which were updated to fix the current issue along with the other dependent binaries which were added after the last public release. At a block 120, other dependent binaries are only tested for integration.

The testing of only certain binaries addresses certain problems with previous methods of patch releases. Certain types of patch releases typically contain more than one binary in them. To ship a patch with quality, all of the binaries included in the package typically had to be tested thoroughly using standard test guidelines. Unique patches tend to contain more than one binary and in many of the cases only a smaller set of the binaries contained in the package need to be new. Other binaries (called dependent binaries from here on) are carried along because they are required for the changed binaries to function properly. Previously, when a new fix (patch) needed to be released, the latest versions of all of the binaries were included in the patch whether they needed to be new or not. The testing in such cases typically could take several weeks to complete. The embodiment of the present invention addresses these issues in that there is no need for the latest versions of these dependent binaries unless the dependency was introduced as part of the fix for this patch.

It will be appreciated that the invention addresses a number of drawbacks with regard to the previous methods. With regard to the previous long times needed to release, since now only the changed binaries in the patch are tested, the overall time and resource requirement for testing and development are reduced. With regard to quality improvement, since the patch contains previously tested versions of the dependent binaries, no new risk is introduced by carrying along these extra binaries. Since in many cases most of the customers will already have the version of the dependent binaries on their system when they get a new patch, they do not need to download all of the binaries contained in the package, thus saving bandwidth. Furthermore, with this new approach customers only have to test the binaries which have changed, rather than everything included in the package. This is able to speed up the deployment of critical patches.

As an example, in a release there may be only a single binary which is being modified, while all the other binaries are being included due to dependency issues. Without the method of the present invention, the latest versions of all these binaries would be included which would incur huge testing costs because all of the binaries may be fairly active and may have frequent changes in them. Also, even though the customer does not need the latest versions of all of the binaries, he gets it because these binaries have higher versions than the ones on his system. With the method of the present invention, all of these binaries, provided there is no regression in any of them, would come from a cache so that only some integration testing would be required on them and the customer would only get updated versions of the binaries which he does not already have.

In accordance with the embodiment of the present invention, a determination is made as to whether a binary can be used from the last known good (LKG) cache or not. One way to do this is to store the file versions when the dependencies are introduced. This indicates that the system stores the start version of when a binary became dependent on another binary. When it is to be determined if a binary can be used from the LKG cache, a determination is made as to whether the binary version is equal to or greater than when the dependency was introduced. Another way to determine if a binary is from a last known good cache or not is to use the generation time of the binary to determine whether the dependency was introduced before or after the binary in question was built.

Figure 2:
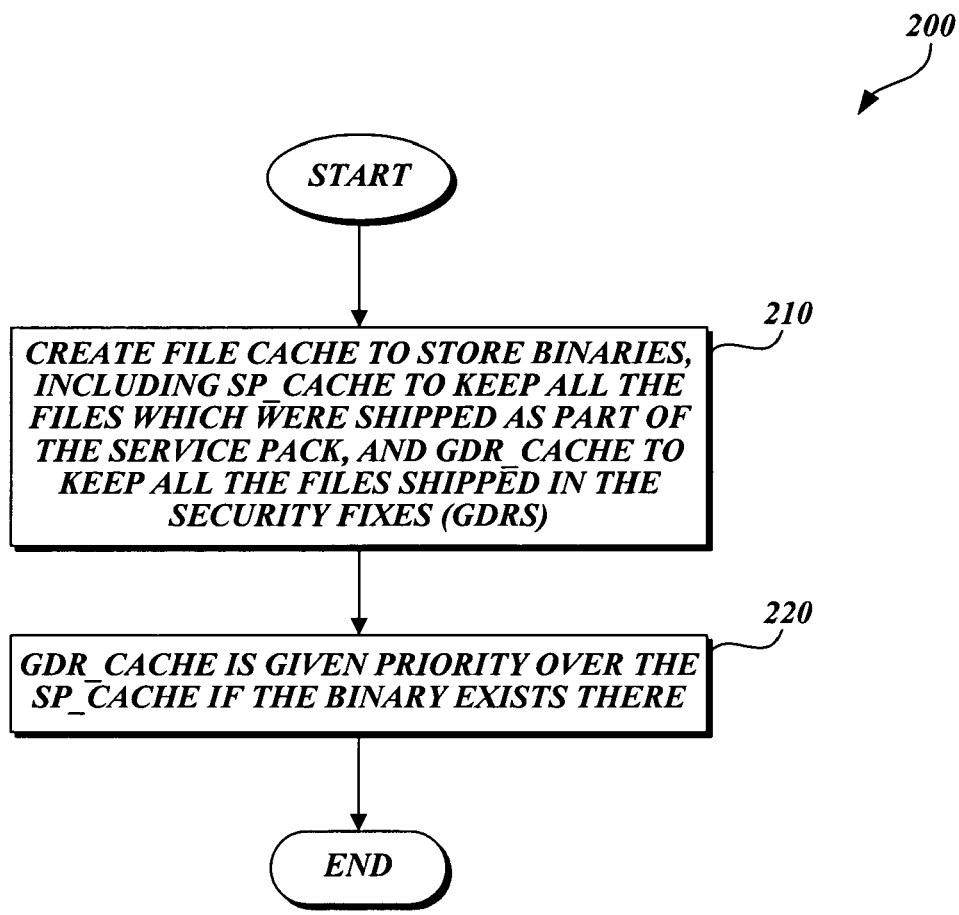
FIG. 2 is a flow diagram illustrative of a routine for creating file caches to store binaries including an SP cache and a GDR cache.

FIG. 2 is a flow diagram illustrative of a routine for creating file caches including an SP cache and a GDR cache. At a block 210, file caches are created to store binaries, including an SP cache to keep all of the files which were shipped as part of the service pack, and a GDR cache to keep all the files shipped in security fixes (GDRs). At a block 220, the GDR cache is given priority over the SP cache if the binary exists there.

Figure 3:
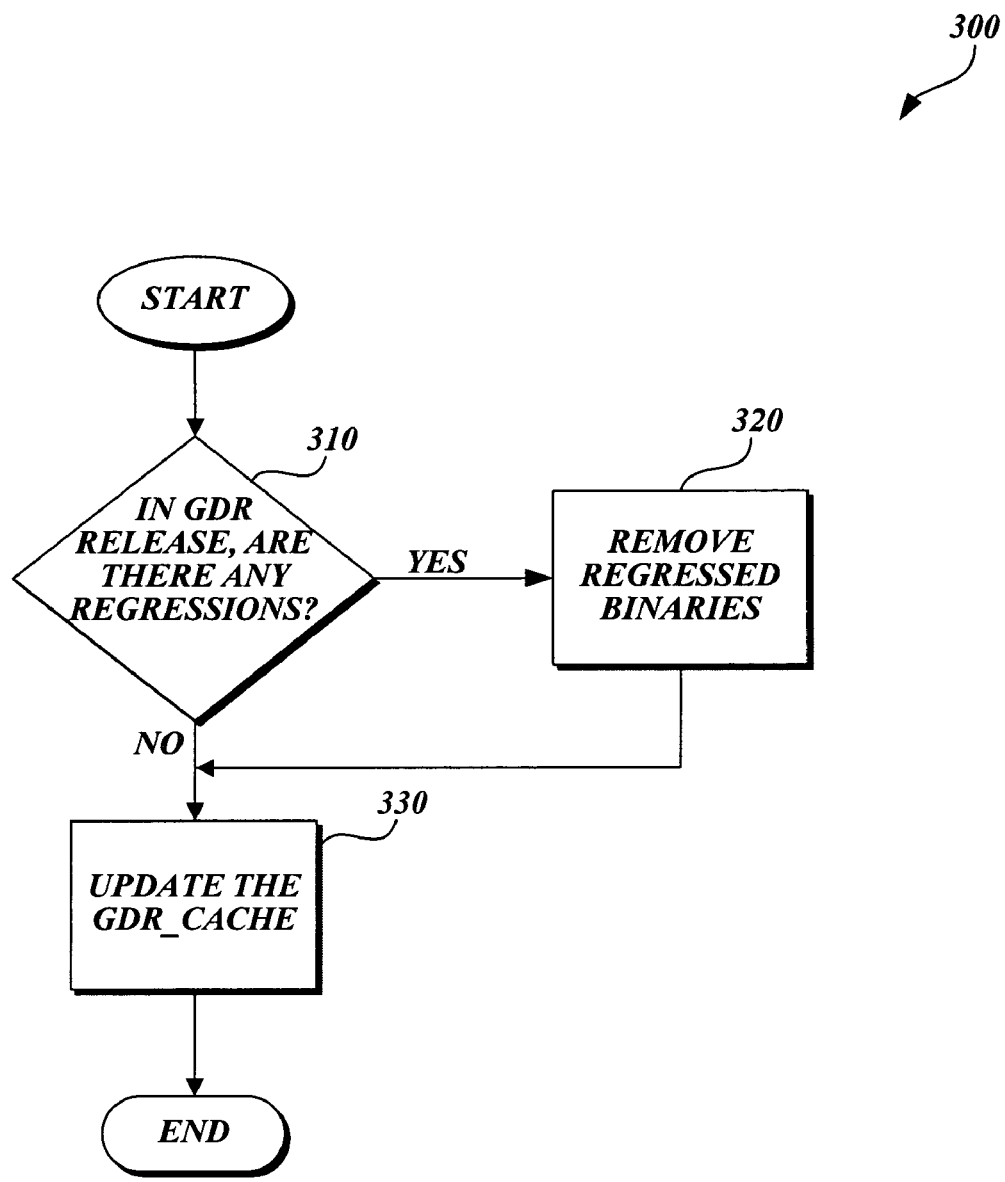
FIG. 3 is a flow diagram illustrative of a general routine for testing whether there are any regressions in the GDR release.

FIG. 3 is a flow diagram illustrative of a routine 300 for deleting binaries which had regressions in them from a GDR cache. At a decision block 310, a determination is made as to whether in the GDR release there are any binaries with regressions. If there were binaries with regressions, then at a block 320, the binaries with regressions are removed. At a block 330, the GDR cache is updated.

Figure 4:
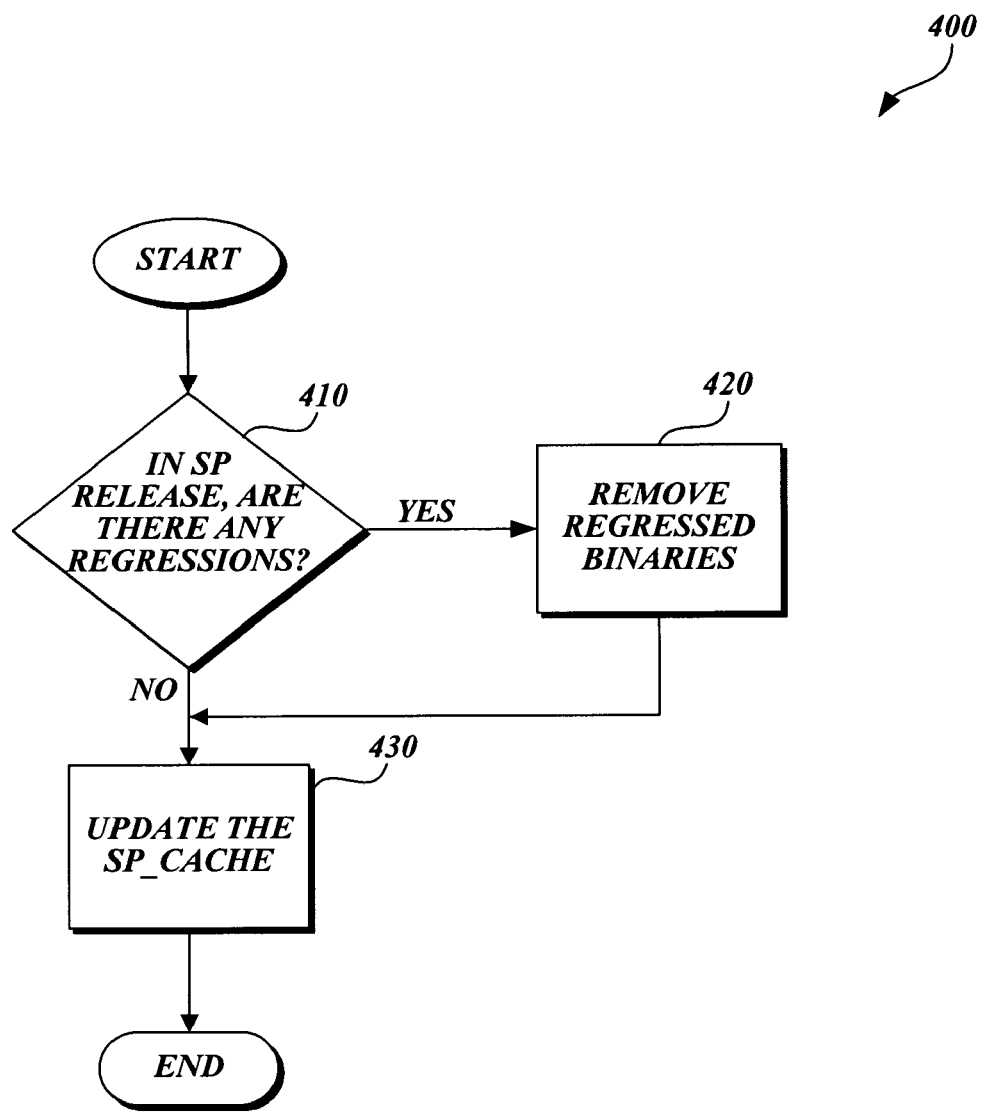
FIG. 4 is a flow diagram illustrative of a general routine for testing whether there are any regressions in an SP release.

FIG. 4 is a flow diagram illustrative of a routine 400 for deleting binaries with regressions from an SP cache. At a decision block 410, a determination is made as to whether in the SP release there are any binaries with regressions. If there are any binaries with regressions, then at a block 420 the binaries with the regressions are removed. At a block 430, the SP cache is updated. It will be appreciated that the routines 300 and 400 of FIGS. 3 and 4, respectively, allow all of the binaries which have regressions in them to be deleted in order to avoid their being shipped in future public releases.

Figure 5:
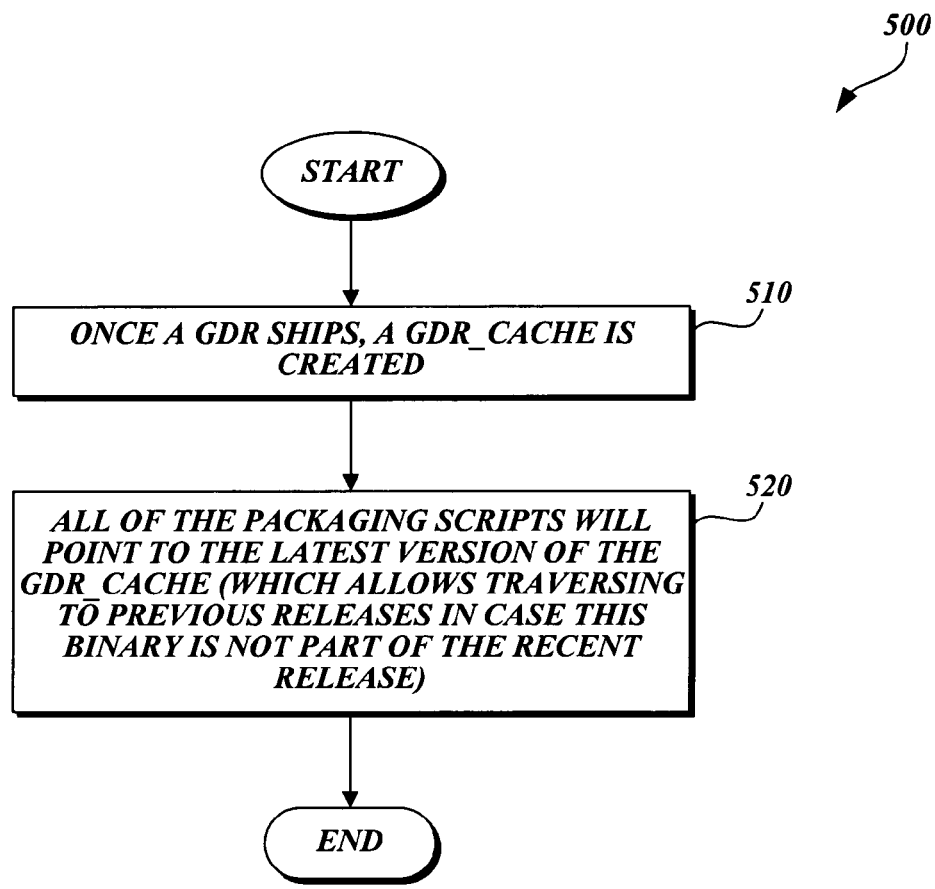
FIG. 5 is a flow diagram illustrative of a routine for a GDR cache.

FIG. 5 is a flow diagram illustrative of a routine 500 for creating a GDR cache once a GDR ships. At a block 510, once a GDR ships, a GDR cache is created. At a block 520, all of the packaging scripts point to the latest version of the GDR cache. This allows the system to traverse to previous releases in case this binary was not part of the recent release.

Figure 6:
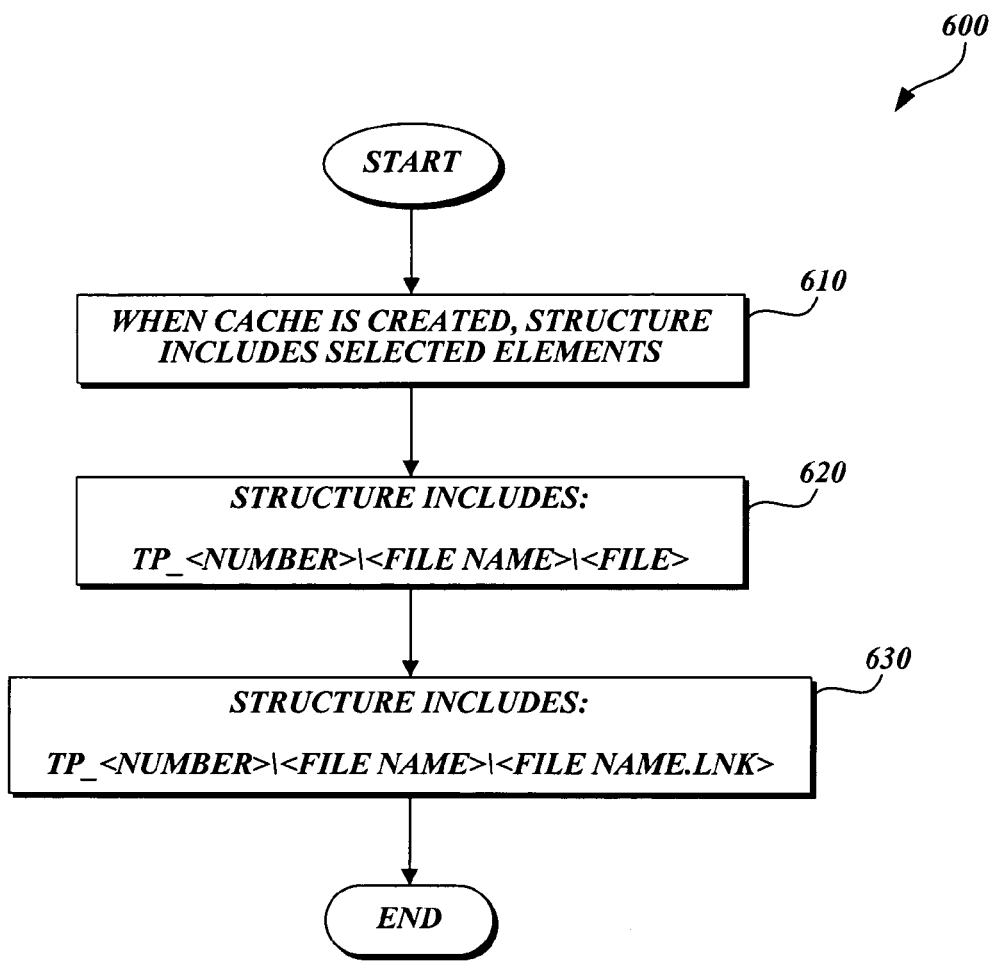
FIG. 6 is a flow diagram illustrative of a general routine for including selected elements in a cache.

FIG. 6 is a flow diagram illustrative of a routine 600 for including selected elements when the cache is created. At a block 610, when the cache is created, the structure is made to include selected elements. The cache structure is as follows:

TP_<NUMBER>\<FILE NAME>\<FILE>

TP_<NUMBER>\<FILE NAME>\<FILE NAME.LNK>

The FILE NAME.LNK is a text file which denotes the generation time of the binary which is used in the calculations to determine if this binary could be picked up in the package as a dependent binary or not.

Figure 7:
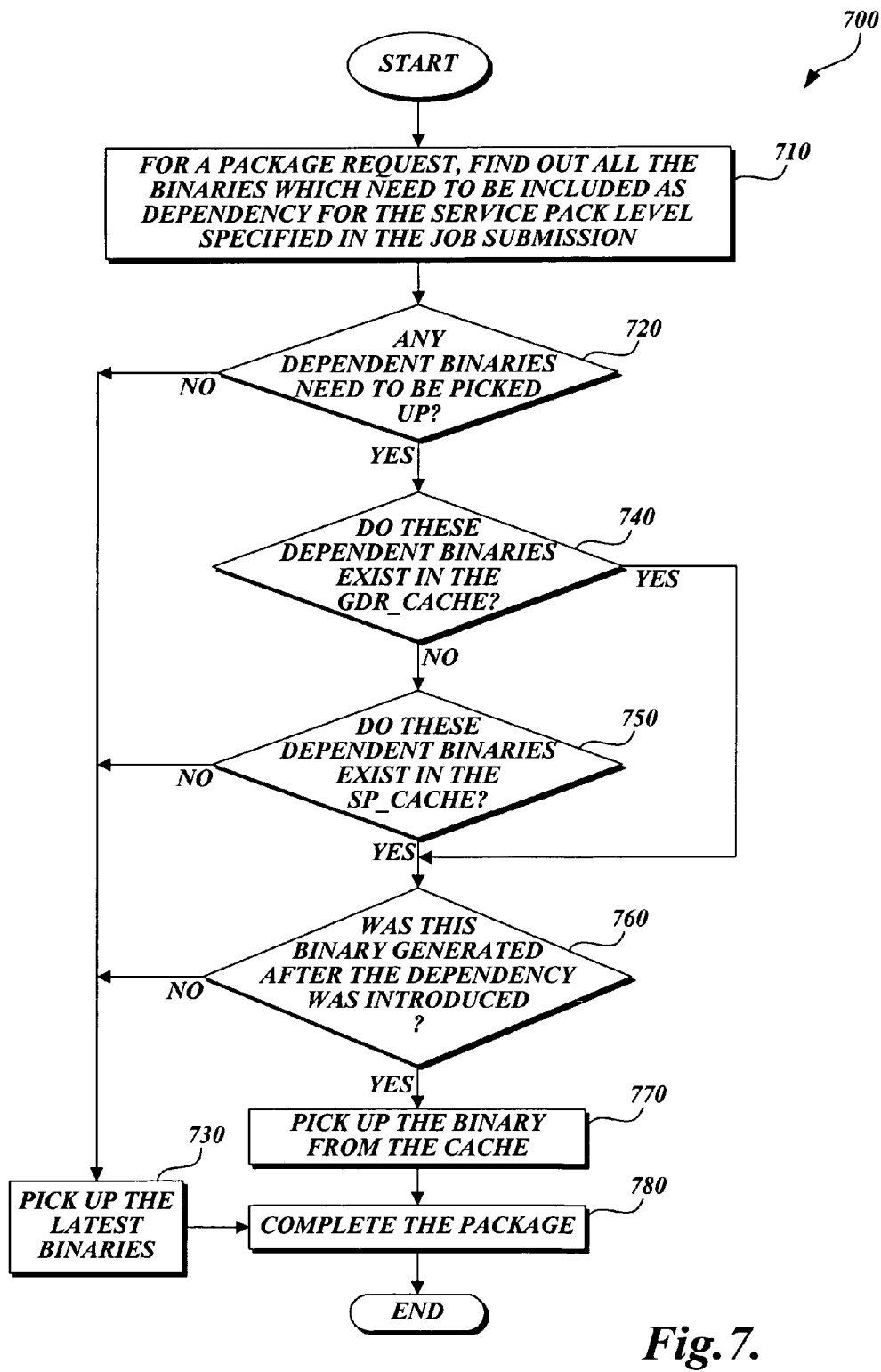
FIG. 7 is a flow diagram illustrative of a routine for a package request.

FIG. 7 is a flow diagram illustrative of a routine 700 for a package request. At a block 710, for a package request, a determination is made of all of the binaries which need to be included as dependency for the service pack level specified in the job submission. At a decision block 720, a determination is made as to whether any dependent binaries need to be picked up. If no dependent binaries need to be picked up, then the routine continues to a block 730, as will be described in more detail below. If any dependent binaries do need to be picked up, then the routine continues to a decision block 740.

At decision block 740, a determination is made as to whether the dependent binaries exist in the GDR cache. If the dependent binaries do exist in the GDR cache, then the routine continues to a block 760, as will be described in more detail below. If the dependent binaries do not exist in the GDR cache, then the routine continues to a decision block 750.

At decision block 750, a determination is made as to whether these dependent binaries exist in the SP cache. If the dependent binaries do not exist in the SP cache, then the routine continues to the block 730, as will be described in more detail below. If the dependent binaries do exist in the SP cache, then the routine continues to a decision block 760.

At decision block 760, a determination is made as to whether this binary was generated after the dependency was introduced. If the binary was not generated after the dependency was introduced, then the routine continues to block 730, where the latest binaries are picked up. If the binary was generated after the dependency was introduced, then the routine continues to a block 770, where the binary is picked up from the cache. From blocks 730 and 770, the routine continues to a block 780 where the package is completed.

In accordance with the above routine, the packaging process takes all of the binaries which are listed as the affected binaries for a particular packing job submitted to a build team and does the following. All of the binaries which need to be included as dependency for the service pack level specified in the job submission are determined, and if there are no dependent binaries, then the LKG process does not need to run and the latest version of all of the binaries are picked up. If there are binaries which need to be included as dependencies, then the following steps are performed. First of all, a determination is made as to whether any of the dependent binaries exist in the SP cache or the GDR cache. If they do not exist, then the packaging process picks up the latest version of those binaries for packaging. If they do exist, then a determination is made as to when the dependency was introduced by doing the following. First, a determination is made of the generation time for the binary in question. The dependency database is synchronized (this is a file which is used to keep track of binary dependencies) to the generation time of the binary. If the dependency existed at this time, this binary can be picked from the LKG cache, SP, or GDR, depending on which is newer. If the dependency did not exist at this time, it means that this dependency was introduced after the version of the binary available in either the SP or GDR cache. Once all the binaries are identified for the packaging, the packaging process is run to create the package. Another way to determine the dependent binary information is to store the file version when the dependency is introduced between two binaries. The dependency is expressed by stating that for this binary to work properly, a version equal to or higher than a particular version of the dependent binary must exist. How this works is by finding out the version of the binary where the dependency was introduced and then looking up a cache (GDR/SP) to see if that or a better version of the dependent binary is available.

FIGS. 8-11 provide a brief description of the way the two locations for the SP cache and GDR cache are organized. As noted above, in order for the LKG process to work, two locations are needed, including the SP cache and the GDR cache. As noted above, the GDR cache contains all of the binaries released as part of the GDRs and like the SP cache includes localized versions for all files as well.

Figure 8:
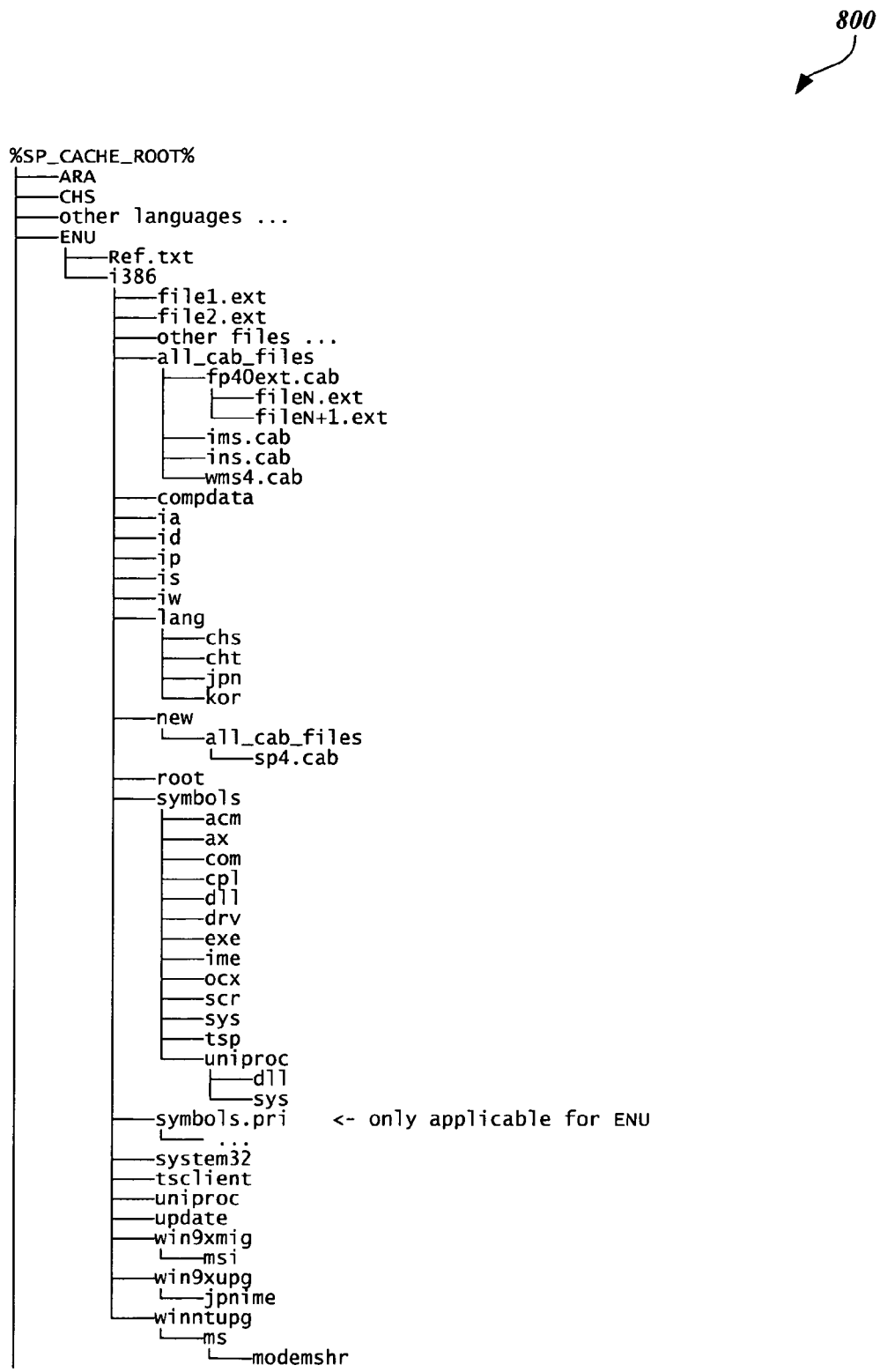
FIG. 8 is a tree diagram showing the organization of an SP cache.
Figure 9:
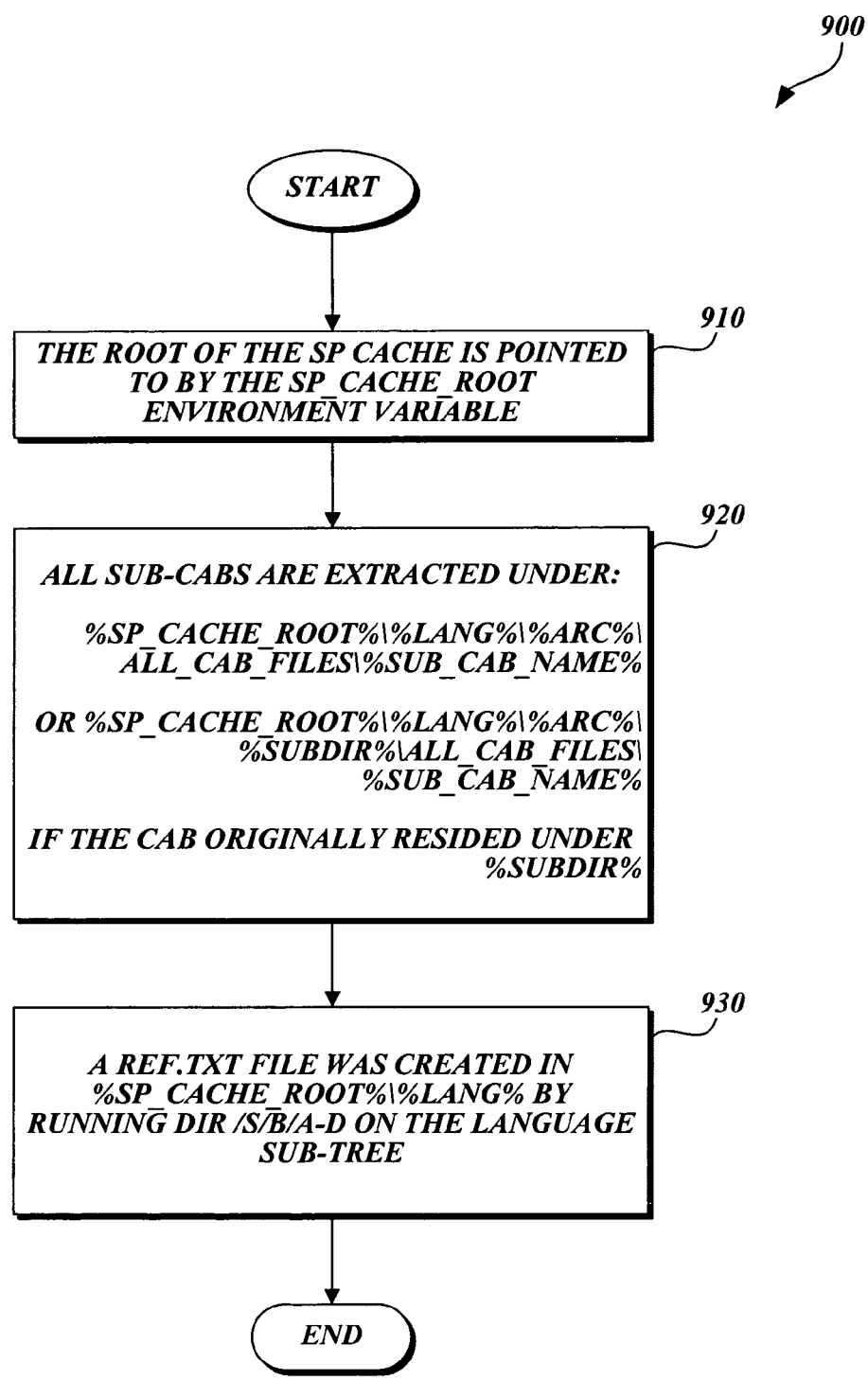
FIG. 9 is a flow diagram illustrative of a routine for the SP cache of FIG. 8.

FIG. 8 is a tree diagram 800 illustrating the organization of the SP cache, while FIG. 9 is a flow diagram illustrative of a routine 900 for the SP cache of FIG. 8. As shown in FIG. 9, at a block 910, the root of the SP cache is pointed to by the SP cache root environment variable. As shown, there are a number of "cab" files in the main SP cab. Because some files (e.g., ntdll.dll) are contained in the main SP cab and in the sub-cabs, extracting the sub-cabs in the root (i.e., %SP CACHE_ROOT%\% Lang%\%Arc%) may not be desirable. For that reason, at a block 920, all sub-cabs are extracted under selected parameters (e.g., % SP CACHE_ROOT%\% Lang%\%Arc%\All_Cab_Files\%Sub_Cab_Name% or %SP CACHE_ROOT%\% Lang%\%Arc%\%SUBDIR%\All_Cab_Files\%Sub_Cab_Name%) if the cab originally resided under %SUBDIR%.

Because searching in the SP cache would be a huge performance hit, as shown at a block 930, a ref.txt file was created in %SP CACHE_ROOT%\%Lang% by running dir /s/b/a-d on the language sub-tree. This is safe, since the content of the SP cache should not change unless a file is found to be regressed in which case it is renamed to *.regressed.

Figure 10:
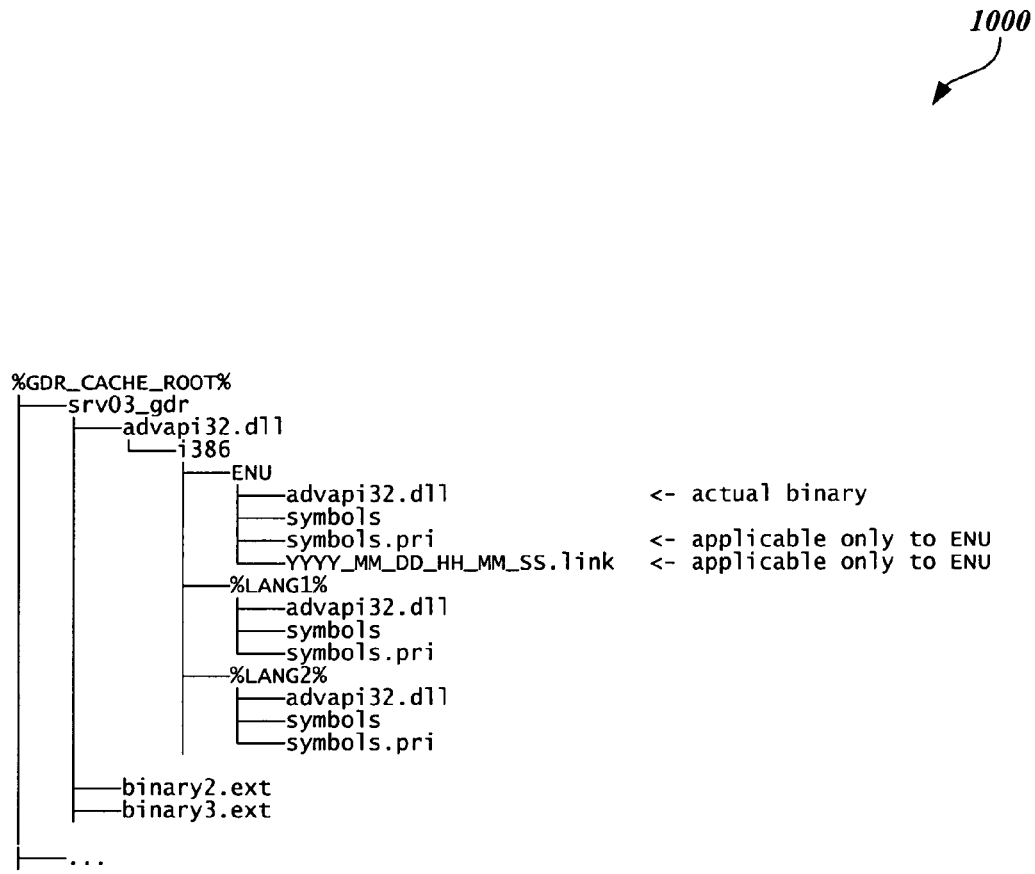
FIG. 10 is a tree diagram showing the organization of a GDR cache.
Figure 11:
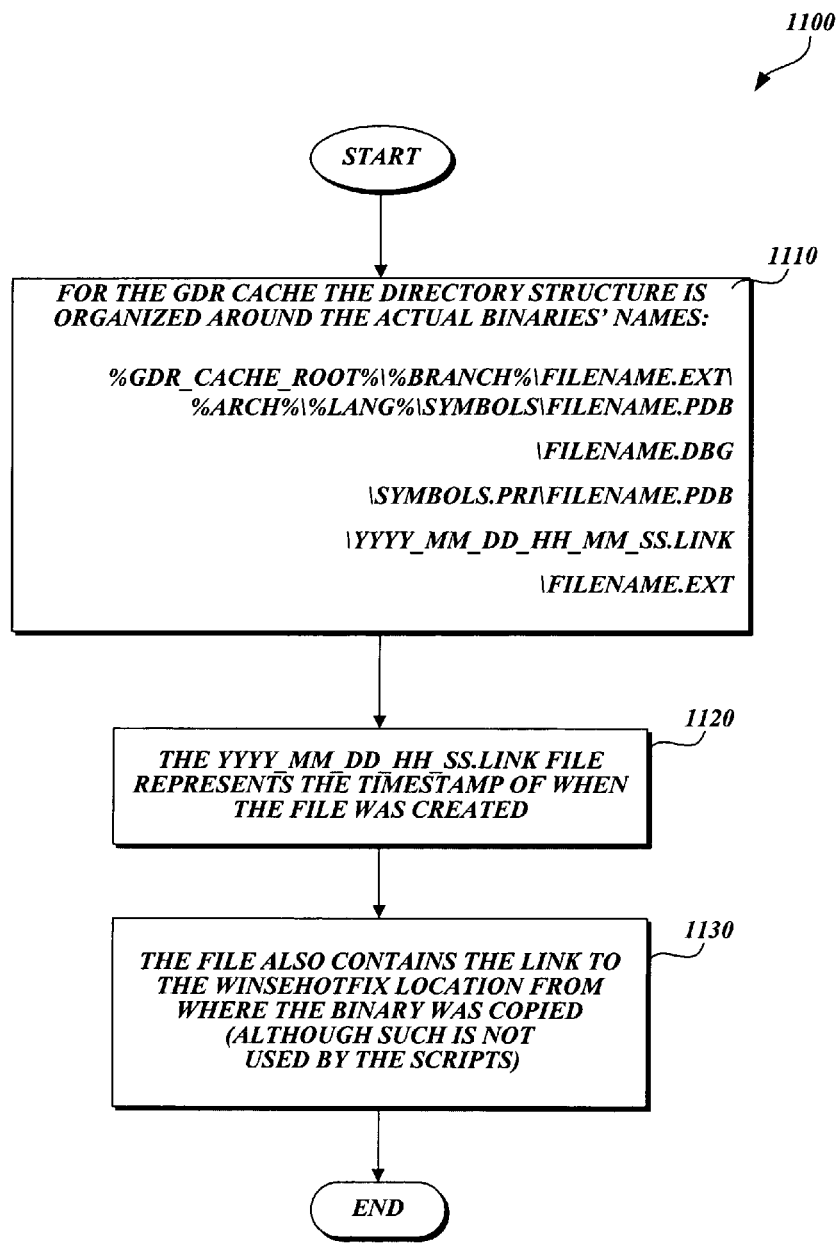
FIG. 11 is a flow diagram illustrative of a routine for the GDR cache of FIG. 10.

FIG. 10 is a tree diagram 1000 illustrating the organization of the GDR cache, while FIG. 11 is a flow diagram illustrative of a routine 1100 for the GDR cache of FIG. 10. As shown in FIGS. 10 and 11, the structure of the GDR cache is somewhat different than the SP cache. Because there is no differentiation among GDR releases apart from which branch the binaries are coming from, at a block 1110, the directory structure is organized around the actual binaries' names. As shown at a block 1120, the YYYY_MM_DD_HH_SS.link file represents the timestamp of when the file was created. As shown at a block 1130, the file also contains the link to the winsehotfix location from where the binary was copied, although such are not used by the scripts. Private symbols are available only for ENU.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for determining whether to include any unmodified files when producing patches that include modified files, the files of each patch comprising at least one modified file and zero or more unmodified files on which the at least one modified file depends to function correctly, the system comprising:
   a file cache for storing files associated with previously-released patches and/or service packs; and
   at least one processor adapted to evaluate unmodified files for possible inclusion in a patch by:
   for each modified file of the at least one modified file:
      receiving as input at least one unmodified file for possible inclusion in a patch, the at least one unmodified file being one on which at least one modified file included in the patch depends to function properly on a destination computer system; and
   for each unmodified file of the at least one unmodified file:
      determining whether a compatible version of the unmodified file exists in the file cache, wherein the determining comprises comparing a first generation time of a cache file in the file cache to time a dependency on the unmodified file was introduced to determine whether the dependency for the unmodified file was introduced before or after the cache file was built; and
      when a compatible version is determined to exist in the file cache based on a determination that the cache file was generated after the dependency was introduced, excluding the unmodified file from the patch, and when a compatible version is determined not to exist in the file cache based on a determination that the cache file was generated before the dependency was introduced, including a latest version of the unmodified file in the patch as a patch dependent file,
   wherein the at least one processor is further adapted to generate the patch by including in the patch the at least one modified file and any unmodified files selected to be patch dependent files.

2. The system of claim 1, wherein the file cache includes at least two levels.

3. The system of claim 2, wherein at least one level of the cache comprises a service pack (SP) cache which includes files from a service pack.

4. The system of claim 2, wherein at least one level of the cache comprises a general distribution release (GDR) cache which includes files from a GDR.

5. The system of claim 4, wherein once a GDR ships, packaging scripts point to a latest version of the GDR cache.

6. The system of claim 1, wherein the at least one processor is further adapted to, once the file cache is created, delete files which have regressions from the file cache to prevent the files which have regressions from being included in future patches.

7. The system of claim 1, wherein the at least one processor makes a last known good determination to determine whether the cache file included in the file cache is a compatible version of the at least one unmodified file.

8. The system of claim 7, wherein making the last known good determination comprises comparing a file version number of the file to a last known good version number stored when a dependency for the at least one unmodified file was introduced.

9. A method for producing patches for updating a software program, the method comprising:
receiving as input at least one changed binary file;
operating at least one processor to perform acts comprising, for each changed binary file of the at least one changed binary file:
receiving as input at least one unmodified binary file for possible inclusion in a patch, the at least one unmodified binary file being a file on which the at least one changed binary file depends to function correctly; and
for each unmodified binary file of the at least one unmodified binary file:
determining whether a compatible version of the at least one unmodified binary file exists in a file cache of binary files associated with previously-released patches and/or service packs by determining whether a dependency for the at least one unmodified file was introduced before or after a cache file in the file cache that was released as part of a previously-released patch and/or service pack was generated;
when a compatible version is determined to exist in the file cache based on a determination that the cache file was generated after the dependency was introduced, excluding the at least one unmodified binary file from the patch; and
when a compatible version is determined not to exist in the file cache based on a determination that the cache file was generated before the dependency was introduced, including in the patch a latest version of the at least one unmodified binary file;
performing testing of the changed binary files and unmodified binary files for which a compatible version did not exist in the file cache;
generating the patch including the changed binary files and the unmodified binary files for which a compatible version did not exist in the file cache; and
making the patch available to users of the software program.

10. The method of claim 9, wherein at least one level of the file cache comprises a service pack (SP) cache which includes files from a service pack.

11. The method of claim 9, wherein at least one level of the file cache comprises a general distribution release (GDR) cache which includes files from a GDR.

12. The method of claim 9, wherein determining whether a compatible version of the at least one dependent binary file exists in the file cache comprises comparing a file version number of a binary file in the file cache to a last known good version number stored when a dependency for the at least one dependent binary file was introduced.

13. The method of claim 9, wherein determining whether a compatible version of the at least one dependent binary file exists in the file cache comprises comparing a generation time of a binary file in the file cache to a generation time of a last known good binary to determine whether a dependency for the at least one dependent binary file was introduced before or after the binary was built.

14. The method of claim 9, wherein when a package is created,
if compatible versions of dependent binary files of the at least one dependent binary file do not exist in at least one layer of the file cache, then latest versions of the binary files are included in the package and
if compatible versions of the dependent binary files do exist in at least one layer of the file cache, then the compatible versions are included in the package.

15. The method of claim 9, wherein the method is executed on at least one processor and the file cache is maintained on at least one computer storage medium accessible by the processor.

16. A system comprising:
at least one computer storage medium having encoded thereon information to be used by at least one application program to determine contents of a patch, the information comprising:
a first cache for keeping first files which were released as part of a service pack (SP), the first files comprising at least one first unmodified file, released as part of a service pack, on which at least one first modified file of the service pack depends to function properly;
a second cache for keeping second files which were released as part of a general distribution release (GDR), the second files comprising at least one second unmodified file, released as part of a GDR, on which at least one second modified file of the GDR depends to function properly;
a dependency database indicating, for a plurality of files, times at which a dependency by a first file on a second file was introduced; and
computer-executable instructions that, when executed, cause a computer to carry out a method of determining, for a modified file, whether a compatible version of an unmodified file exists by:
determining whether a cache file exists in the first cache or second cache that is a version of the unmodified file,
when the cache file exists, retrieving from the dependency database a time at which the dependency on the unmodified file by the modified file was introduced,
determining whether a generation time of the cache file is after the time at which the dependency was introduced, and
when the generation time of the cache file is after the time the dependency was introduced, excluding the unmodified file from a patch comprising the modified file.

17. The system of claim 16, wherein the second cache is examined by the at least one application program prior to the first cache.

18. The system of claim 16, wherein the first and second caches keep records regarding the first and second files and do not store the first and second files.

19. The system of claim 16, further comprising at least one processor to execute the at least one application program.

* * * * *